United States Patent Office 3,538,062
Patented Nov. 3, 1970

3,538,062
POLYMERIZATION OF VINYL CHLORIDE IN MASS
Jean Claude Thomas and Michel Marbach, Lyon, and Francois M. Muller, Saint-Auban, France, assignors to Produits Chimiques Pechiney-Saint-Gobain, Paris, France
No Drawing. Filed Apr. 17, 1967, Ser. No. 631,155
Claims priority, application France, Apr. 22, 1966, 58,623
Int. Cl. C08f 3/30, 15/08
U.S. Cl. 260—78.5    5 Claims

ABSTRACT OF THE DISCLOSURE

Vinyl chloride based polymers are produced by polymerization in mass at temperatures between $-40°$ C. and $+40°$ C. with an alpha-halogenated diacyl peroxide having from 1 to 9 carbon atoms.

---

This invention relates to the polymerization of vinyl chloride in mass. By polymerization is meant homopolymerization, and copolymerization with compatible monomers. By polymerization in mass is meant the absence of solvents, diluents, suspension media, at temperatures and pressures favorable to the production of products of good quality in substantial yield.

Organic peroxides have been used as initiators, for instance benzoyl and lauroyl peroxides, but it has been discovered that their proper function relates to their structure, and that they can be used only within definite temperature limits. For example, benzoyl peroxide is effective at satisfactory rates of production only between $65°$ and $80°$ C. and lauroyl peroxide is commercially useful only at $55°-70°$ C. At such temperatures only products of medium molecular weight and limited properties can be produced. Among the properties of such polymers which we have deemed to be capable of improvement are strength and rigidity at high temperature, softening point, and resistance to solvents such as to perchlorethylene, trichlorethylene, and dichloroethane, that is to say the usual halogenated hydrocarbon solvents.

It is an object of the invention to produce polymers of vinyl chloride having better physical and chemical properties than can be obtained from the usual catalysts which function at the efficient operating temperatures of $50°$ C. and above.

The objects of the invention are accomplished by a method of preparing polyvinyl chloride, which comprises initiating the polymerization of vinyl chloride by placing it in mass in contact with a compound having the formula $$R-\underset{\underset{X}{\diagup}\underset{Y}{\diagdown}}{C}-\underset{\overset{\|}{O}}{C}-O-O-\underset{\overset{\|}{O}}{C}-\underset{\underset{X}{\diagup}\underset{Y}{\diagdown}}{C}-R$$

in which one of X and Y is halogen and the other is one of the group consisting of hydrogen and halogen, and R is one of a group consisting of aliphatic of 1–9 carbon atoms, either saturated or unsaturated, cycloalkane and cycloalkene, aromatic or heterocyclic, which may bear substituents for H of the radical which do not change the fundamental properties of the compound.

The initiators halogenated by all the halogens, chlorine, bromine, iodine, and fluorine are useful but chlorine is usually employed because of lower cost and superior efficiency. The usual substituents on R are halogen.

Compatible monomers which produce homogeneous copolymers are illustrated by the vinyl esters and ethers, e.g., vinyl acetate, vinylidene chloride, the alkyl fumarates, maleic anhydride, trans dichlorethylene, and the styrene family.

In this specification the terms "cyclanic" and "cyclenic" have been used. "Cyclanic" means cycloalkane. The cycloalkanes are saturated cyclic hydrocarbons of the formula $C_nH_{2n}$. A reference to the members cited will show that they are lower cycloalkanes. The term "cyclenic" means cycloalkene, which are unsaturated cyclic hydrocarbons of the formula $C_nH_{2n-2}$. They are also lower members of the series.

Exemplary of the novel initiators are alpha-halogeno acyl peroxides of the aliphatic class such as alpha-chlorocaproyl peroxide, alpha-chlorobutyroyl peroxide, alpha-chloropropionyl peroxide, alpha-chlorocaprylyl peroxide, alpha-chlorocapryl peroxide, alpha-chlorovaleryle peroxide, alpha-bromoheptanoyl peroxide, alpha idiopelargonyl peroxide, alpha-fluoroundecanoyl peroxide, alpha bromobutyroyl peroxide, and alpha-bromocaproyl peroxide.

More complex members of the initiator family are alpha-alpha-dihalogenoacyl peroxides of the aliphatic class, examples of which are alpha-alpha-dichloropropionyl peroxide, alpha-alpha-dichlorobutyroyl peroxide, alpha-alpha-dichlorocaproyl peroxide, alpha-alpha-dichlorocapryl peroxide, alpha-alpha-dibromopropionyl peroxide, and alpha-alpha-dibromocaproyl peroxide polyhalogeno acyl peroxides of the aliphatic class such as alpha-alpha-beta-trichloropropionyl peroxide, alpha-beta-beta trichloropropenoyl peroxide, alpha-bromo-beta-beta-dichlorobutyroyl peroxide.

Among the cycloalkane halogenated peroxides one may cite the acyl peroxide derivative of cyclohexyl dichloracetic acid, the acyl peroxide derivative of methyl-2 cyclohexyl bromacetic acid.

Among the cycloalkene halogenated peroxides is, for example, the acyl peroxide derived from bromo-3 cyclohexenyl-5 chloracetic acid.

These initiators are used in proportions of about 0.0005 to 0.1% by weight of active oxygen based on the weight of monomer subjected to polymerization, and a preferred proportion is from about 0.001 to 0.02%. More than one initiator may be used and they may be admitted at once or at different stages of polymerization.

The new initiators may be used in the so-called Redox polymerization systems, accompanied by reducing agents of the type of trialkylboron hydrazine without or preferably with molecular oxygen.

A satisfactory efficient temperature range is about $-40°$ to $40°$ C. but preferred ranges will be established for individual initiators. For example alpha-chloropropionyl peoxide produces rapid polymerization of vinyl chloride in mass at $20°$ to $35°$ C., whereas the preferred range for alpha-chlorocaproyl peroxide is from $10°$ to $25°$ C., and that for alpha-alpha-dichloropropionyl peroxide is $-2°$ to $12°$ C.

The present invention is equally applicable to all techniques of polymerization in mass for instance to those described in French Pats. 1,079,722, 1,257,780, 1,357,-736, 1,382,072, 1,436,744, 1,450,464, 1,427,935 and 1,427,936, of which the latter two are of the new and superior two-stage type. In the latter cases the initiator may be used in such amounts that under the conditions of polymerization it has wholly disappeared at the end of the first-stage.

The new products are recognizable in that they have properties superior to similar polymers produced by ordinary catalysts under their most favorable conditions of operation.

The following examples illustrate the invention without limiting the generality which is elsewhere herein expressed.

EXAMPLE 1

A stainless steel autoclave of 200 l. capacity having a horizontal rotary cylinder with a line of rolling balls (French Patent 1,079,772) received 75 kg. of vinyl chloride, 0.715 kg. of alpha-chlorocaproyl peroxide in petroleum ether to make 17.8% solution providing 0.97% of active oxygen. 5 kg. of monomer were released to purge the autoclave. A concentration of active oxygen was 0.01% of the monomer. The temperature of the autoclave was maintained at 10° C. by external water circulation. The internal pressure was 1.5 bars relative. The rotation of the autoclave caused an energetic stirring of the reaction mass. After 8 hours 25 minutes the remaining monomer was freed from the autoclave and 27.3 kg. of polyvinyl chloride were recovered corresponding to a yield of 39% of the monomer. The resin had a Fikentscher index K of 111, and a bending temperature of 81.5° measured according to the method of Clash and Berg.

EXAMPLE 2

A fixed stainless steel cylindrical autoclave with a paddle-type agitator of two blades and a capacity of 500 l. received 198 kg. of vinyl chloride monomer and 2.17 kg. of a 21.4% solution of alpha-alpha-dichloropropionyl peroxide in trichlorotrifluoroethane, which thus contained 1.2% of active oxygen. The autoclave was purged by release of 18 kg. of monomer and the concentration of active oxygen of the initiator was 0.02% by weight of the monomer in the autoclave. The temperature was lowered to −5° C. by circulating cold brine about the cylinder, producing a relative pressure of 0.450 bars. The concentration of active oxygen by weight relative to the agitation was then started. After 19 hours of polymerization the residual monomer was released and the polyvinyl chloride was discharged. It weighed 121 kg. for a yield of 67.2%. The K index was 119 and its softening temperature was 84° C.

EXAMPLE 3

A vertical autoclave of 1 l. capacity provided with a stainless steel agitator received 330 g. of vinyl chloride monomer and 5.62 g. of a 17.6% solution of alpha-alpha-beta-trichloropropionyl peroxide in hexane, which thus contained 0.8% by weight of active oxygen. The autoclave was purged by the release of 30 g. of monomer. The concentration of active oxygen by weight relative to the monomer was 0.015%. The temperature was maintained at 0° C. by circulating refrigerated methanol in the envelope of the cylinder. The pressure within the autoclave was 0.75 bar relative. Agitation was started. After 5 hours the residual monomer was released and the polyvinyl chloride was discharged weighing 145 g. The yield was 48.5% of a resin having a K index of 112 and a bending temperature of 82.5° C.

EXAMPLE 4

A stainless steel autoclave containing 200 l. provided with a high speed turbine agitator received 130 kg. of vinyl chloride monomer and 91 g. of alpha-chloropropionyl peroxide in 17.75% solution in hexane, which thus contained 1.32% active oxygen. The autoclave was purged by release of 10 kg. of monomer and the concentration by weight of active oxygen with respect to the monomer was 0.001%. The temperature was established at 40° C. by circulation of water in the envelope of the autoclave, the internal pressure of which was 5 bars relative. After 3 hours of polymerization no further heat was released by the reaction mass, the initiator having been completely consumed. The degree of polymerization calculated by a release of heat was about 10%. The mixture of monomer and polymer was flowed by gravity into a horizontal rotary autoclave of the type of Example 1 of 500 l. capacity provided with a double envelope, the interior of which was connected to the prepolymerizer by an inclined tube. The second autoclave had been charged with 36 g. of lauroyl peroxide. The temperature was established at 40° C. which established an internal pressure of 5 bars relative. After 17 hours of polymerization in the second autoclave with mild agitation, residual monomer was discharged and the product recovered. The weight of polyvinyl chloride was 69.5 kg. for a yield of 58% of the monomer employed.

The present example demonstrates the efficiency of the initiator when used in the superior technique by which the first stage of polymerization is carried out with violent agitation and the second with very mild agitation. The temperatures employed were higher than those normally used in order to accomplish the total degradation of the initiator during the first stage, which automatically achieved the chosen degree of transformation without special precautions at the moment when the transfer of the mixture of monomer and polymer from the prepolymer autoclave to the second autoclave was to take place.

EXAMPLE 5

An apparatus identical with that of Example 3 received 330 g. of vinyl chloride and 2.73 g. of alpha-chlorocapryl peroxide in 28.2% petroleum ether which thus provided 1.1% of active oxygen. The autoclave was purged by releasing 30 g. of monomer. The concentration of active oxygen by weight in the monomer was 0.01%. The temperature was established at 15° C. and the pressure was 1.9 bars relative. After 10 hours of polymerization the residual monomer was discharged and 135 g. of polyvinyl chloride were recovered, constituting a yield of 45% of the monomer treated. The resin had a K of Fikentscher of 110 and a bending temperature under torsion of 80.5°.

The advantages of the invention are in the accomplishment of the objects of the invention as stated hereinabove and in the superior properties of the product and superior efficiency of the process as set forth in the examples.

As many apparently widely different embodiments of the present invention may be made without departing from the spirit and scope thereof, it is to be understood that the invention is lot limited to the specific embodiments.

What is claimed is:

1. A method of preparing polymers having a base of vinyl chloride which comprises putting a monomeric composition comprising preponderantly vinyl chloride in mass in contact with an alpha-halogenated diacyl peroxide having the formula

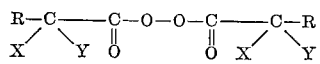

in which X is halogen, Y is selected from the group consisting of hydrogen and halogen, and R is a radical selected from the group consisting of the saturated aliphatic radicals having 1–9 carbon atoms, the unsaturated aliphatic radicals having 1–9 carbon atoms, cycloalkane radicals, cycloalkene radicals, aromatic radicals, and heterocyclic radicals, and polymerizing the monomers while agitating at a temperature in the range of −40° C. to +40° C. at a pressure at which the vinyl chloride is liquid, said alpha-halogenated diacyl peroxide being present in the amount to provide an amount of active oxygen in the proportion of about 0.0005% to 0.1% by weight of the weight of monomeric composition.

2. A method according to claim 1 in which the alpha-halogenated diacyl peroxide provides about 0.001% and about 0.02% of active oxygen by weight of the monomer.

3. A method according to claim 1 in which the temperature is between −15° C. and +35° C.

4. A method according to claim 1 in which the monomeric composition includes a comonomer selected from the class consisting of the vinyl esters, vinyl ethers, alkyl fumarates, styrene, vinylidene chloride, trans dichloroethylene, and maleic anhydride.

5. A method of preparing polymers having a base of vinyl chloride which comprises putting a monomeric composition comprising preponderantly vinyl chloride in contact with a catalytic amount of an alpha-halogenated diacyl peroxide having the formula

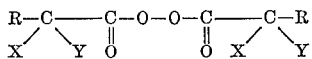

in which X is halogen, Y is selected from the group consisting of hydrogen and halogen, and R is a radical selected from the group consisting of saturated aliphatic radicals having 1–9 carbon atoms, the unsaturated aliphatic radicals having 1–9 carbon atoms, cycloalkane radicals, cycloalkene radicals, aromatic radicals and heterocyclic radicals, with agitation of high turbulence in the initial stages of polymerization, terminating the highly turbulent agitation before polymerization is complete and continuing it with mild agitation in which the temperature during polymerization is between −40° C. and +35° C. and the amount of the alpha-halogenated diacyl peroxide is in an amount to provide an amount of active oxygen from about 0.0005% and about 0.1% by weight of the weight of monomeric composition.

References Cited
UNITED STATES PATENTS

| | | | |
|---|---|---|---|
| 2,559,630 | 7/1951 | Bullitt | 260—92.8 |
| 2,792,423 | 5/1957 | Young et al. | 260—610 |
| 3,089,865 | 5/1963 | Walther et al. | 260—610 |
| 3,169,947 | 2/1965 | Stroh et al. | 260—85.5 |

OTHER REFERENCES

Steinbach et al.: Chem. ABS., 60 (1964), p. 13341d.
Sianesi et al.: Chem. ABS, 62 (1965), p. 663d.

HARRY WONG, JR., Primary Examiner

U.S. Cl. X.R.

260—87.1, 87.5, 87.7, 92.8